United States Patent
Winter

(10) Patent No.: US 9,821,396 B2
(45) Date of Patent: Nov. 21, 2017

(54) PLOW BLADE

(71) Applicant: Kent Winter, Willoughby, OH (US)

(72) Inventor: Kent Winter, Willoughby, OH (US)

(73) Assignee: Winter Equipment Company, Willoughby, OH (US)

( * ) Notice: Subject to any disclaimer, the term of this patent is extended or adjusted under 35 U.S.C. 154(b) by 227 days.

(21) Appl. No.: 14/885,325

(22) Filed: Oct. 16, 2015

(65) Prior Publication Data

US 2016/0039030 A1  Feb. 11, 2016

Related U.S. Application Data

(62) Division of application No. 13/968,127, filed on Aug. 15, 2013, now Pat. No. 9,163,379.

(51) Int. Cl.

| | |
|---|---|
| *B23K 1/002* | (2006.01) |
| *E02F 3/815* | (2006.01) |
| *B23K 1/00* | (2006.01) |
| *B23K 1/20* | (2006.01) |
| *B23K 1/19* | (2006.01) |
| *B23K 31/02* | (2006.01) |
| *E01H 5/06* | (2006.01) |
| *B23K 1/008* | (2006.01) |
| *B23K 35/02* | (2006.01) |

(Continued)

(52) U.S. Cl.
CPC .............. *B23K 1/002* (2013.01); *B23K 1/008* (2013.01); *B23K 1/0008* (2013.01); *B23K 1/19* (2013.01); *B23K 1/20* (2013.01); *B23K 1/203* (2013.01); *B23K 31/02* (2013.01); *B23K 35/025* (2013.01); *B23K 35/0227* (2013.01); *B23K 35/0244* (2013.01); *C22C 38/002* (2013.01); *C22C 38/02* (2013.01); *C22C 38/04* (2013.01); *C22C 38/22* (2013.01); *C22C 38/32* (2013.01); *E01H 5/061* (2013.01); *E02F 3/8152* (2013.01); *B23K 2201/00* (2013.01); *B23K 2203/04* (2013.01); *B23K 2203/18* (2013.01); *B23K 2203/50* (2015.10); *B23K 2203/52* (2015.10)

(58) Field of Classification Search
CPC ......... E01H 5/061; E01H 5/066; E01H 5/062; B23K 1/0008; B23K 31/02; B23K 1/008; B23K 1/19; B23K 1/203; B23K 2201/00; B23K 2203/04
USPC ....... 228/175, 189, 120, 121, 122.1; 29/530, 29/458
See application file for complete search history.

(56) References Cited

U.S. PATENT DOCUMENTS 3,889,093 A * 6/1975 Fawcett ................... B23K 1/00
219/106
4,756,102 A * 7/1988 Chapman ................. E01H 1/04
172/719

(Continued)

*Primary Examiner* — Erin Saad
(74) *Attorney, Agent, or Firm* — Fay Sharpe LLP

(57) ABSTRACT

The present disclosure provides a plow blade edge device for mounting to a moldboard of a plow comprising at least one adapter blade including a bottom edge having selectively carbide insert(s) along at least a portion of the bottom edge. The disclosure further provides for a method of brazing the carbide insert(s) in a cavity along at least a portion of the bottom edge. The device further includes at least one wear block selectively reversible to present the adapter blade at a first angle or a second angle. The at least one wear block can include a bottom edge having a carbide insert along at least a portion of the bottom edge.

25 Claims, 6 Drawing Sheets

(51) Int. Cl.
*C22C 38/00* (2006.01)
*C22C 38/02* (2006.01)
*C22C 38/04* (2006.01)
*C22C 38/22* (2006.01)
*C22C 38/32* (2006.01)
*B23K 101/00* (2006.01)
*B23K 103/04* (2006.01)
*B23K 103/00* (2006.01)
*B23K 103/18* (2006.01)

(56) References Cited

U.S. PATENT DOCUMENTS

| | | | | |
|---|---|---|---|---|
| 8,807,837 B1* | 8/2014 | Gonzalez | ................ | F16C 17/04 384/278 |
| 2013/0168158 A1* | 7/2013 | Belnap | ................... | E21B 10/46 175/428 |
| 2013/0175097 A1* | 7/2013 | Wardley | ................. | E21B 10/43 175/432 |
| 2013/0199693 A1* | 8/2013 | Tank | ......................... | B05B 1/00 156/60 |
| 2015/0078905 A1* | 3/2015 | Albuzat | ............... | B23K 1/0018 416/213 R |

* cited by examiner

PLOW BLADE

RELATED APPLICATIONS

This application is a divisional of U.S. patent application Ser. No. 13/968,127 which was filed on Aug. 15, 2013 and is still pending.

The present disclosure relates generally to devices for improving the durability, performance, and operation of plow and grader blades. Specifically, the present disclosure provides an improved blade edge, for example, snow plow edge/grader blade edge and inserts therefor including a method for forming and replacing (i.e. replenishing).

BACKGROUND

Rough terrain and cold weather conditions have caused problems for snow plow and grader blades for as long as there have been plows. Although many modifications and alternative designs have been made to plow and grader blades in attempts to control expenses while improving the life, durability, and performance of plow blades, in particular, the life, durability and performance of plow blade edges. Most of these heretofore modifications and alterations did not provide sufficient durability and ride improving capabilities to deal with, among other things, the rough terrain and cold weather that plow blades are typically exposed to. Typically, plow edges are metallic, for example, steel, and are excessively damaged or even destroyed due to wear from contact between the plow edge and the terrain and corrosion (which is exacerbated by road salt). Such prior art blade edges must frequently be repaired or replaced.

Additionally, it is conventional to provide to the plow or plow attachment frame caster-like wheels, mushroom shoes, wear skid shoes or wear blocks which are attached to, but spaced from, the plow moldboard for the purpose of supporting part of the load on the blade. These known prior art devices are relatively bulky, expensive to manufacture, and difficult to install on the snow plow. The cast iron material typically used on the wear blocks does not provide protection against fracturing or breakage, due to the relative brittleness of cast iron, when the blocks are subjected to impacts. The result is that prior art wear blocks are expensive to maintain and replace.

Thus, there has been a need for an improved means which supports and protects the cutting edge of, for example, a plow blade from the roadbed for reducing the undesirable abrasive action on the blade edge. The disadvantages of present wear block constructions have resulted in the improved skid block-wear surface and mountings of the present disclosure which effectively reduces blade wear and block replacement resulting from road abrasion. Furthermore, the present disclosure can increase blade (cutting edge) life and wear block life, reduce blade breakage and maintenance, increase durability of carbide inserts, reduce manufacturing costs; and protect the moldboard body mounted thereto.

In one embodiment, the present disclosure relates to a combination carbide insert blade with wear blocks all combined into one unit. The carbide inserts can be a singular self-contained insert or selectively a combination of two or more inserts brazed into an opening or channel in the blade. The wear blocks can include a wear surface including an abrasion resistant carbide matrix welding deposit filling one or more cavities along, and integrated with, the wear surface.

The present disclosure describes a device, mounting method, and manufacturing method (i.e. brazing method) which can be used to provide new (or replenishment of) plow blade edges or replace worn plow blade edges, in particular, snow-plow blade edges and inserts for the plow blade edges, or other grader surface plows, that overcome many of the limitations of the prior art.

SUMMARY

One aspect of this disclosure provides a plow blade edge system for mounting to a moldboard of a plow comprising: a first plow blade edge segment and a second plow blade edge segment. Each plow blade segment comprising: at least one adapter blade including a bottom edge selectively having a carbide insert along at least a portion of the bottom edge; and, at least one wear block welded to a back side of each said adapter blade wherein the at least one wear block includes a bottom edge having a carbide insert along at least a portion of the bottom edge. The first plow blade edge segment can be mounted adjacent to the second plow blade edge segment.

Another aspect of the disclosure provides a method for brazing solid carbide inserts to a plow blade, comprising: forming a channel into a steel section along at least a portion of a bottom edge of a plow blade; applying brazing flux to the channel surface; inserting a first layer of braze into a base of the channel; inserting a first carbide insert over the first brazing layer; inserting at least a second layer of braze over the first carbide insert; inserting at least a second carbide insert over the at least second brazing layer; heating the first layer and the at least second layer of braze, and the first carbide insert and the at least second carbide insert at a temperature of at least 1500 degrees Fahrenheit; and, melting the first layer and the at least second layer of braze completely around the first carbide insert and around a majority of the at least second carbide insert for securing the first carbide insert and the at least second carbide insert within the channel.

Yet another aspect provides a method for brazing solid carbide inserts to a plow blade, comprising: forming a channel into a steel section along at least a portion of a bottom edge of a plow blade; applying brazing flux to the channel surface; inserting a first layer of braze into a base of the channel; inserting a first carbide insert over the first brazing layer; inserting at least a second layer of braze over the first carbide insert; inserting at least a second carbide insert over the at least second brazing layer; wherein a volume of the at least second carbide insert is greater than a volume of the first carbide insert; heating the first layer and the at least second layer of braze; and, melting the first layer and the at least second layer of braze completely around the first carbide insert and around a majority of the at least second carbide insert for securing the first carbide insert and the at least second carbide insert within the channel.

BRIEF DESCRIPTION OF THE DRAWINGS

The subject matter which is regarded as the disclosure is particularly pointed out and distinctly claimed in the concluding portion of the specification. The present disclosure, however, both as to organization and method of practice, together with further objects and advantages thereof, may best be understood by reference to the following detailed descriptions of the preferred embodiments and the accompanying drawings in which:

DETAILED DESCRIPTION

FIGS. 1-4 are various perspective views and cross-sectional views, including two aspects, of a plow assembly or plow blade edge system 10 which can include a plow body 12 having, for example, a hemispherical and funnel shaped steel construction, or other materials, for deflecting snow or other media. Plow assembly is typically attached to a vehicle (not shown) by means of an appropriate frame or housing (also not shown). The vehicle may be any vehicle ranging from a standard car or pickup truck, to a sand and salt carrying dump truck, to a road grader having a belly mounted blade, to huge earth moving or commercial highway snow moving plows. The means of attaching plow body 12 to a vehicle may also typically include some form of hydraulic mechanism for positioning plow assembly as desired, as is typical in the art. The plow assembly may also include one or more reinforcing members (not shown) to provide strength and rigidity to plow body 12. Reinforcing members are typically standard structural angles which are attached to the back of plow body 12, for example, by means of welding.

Figure 1:
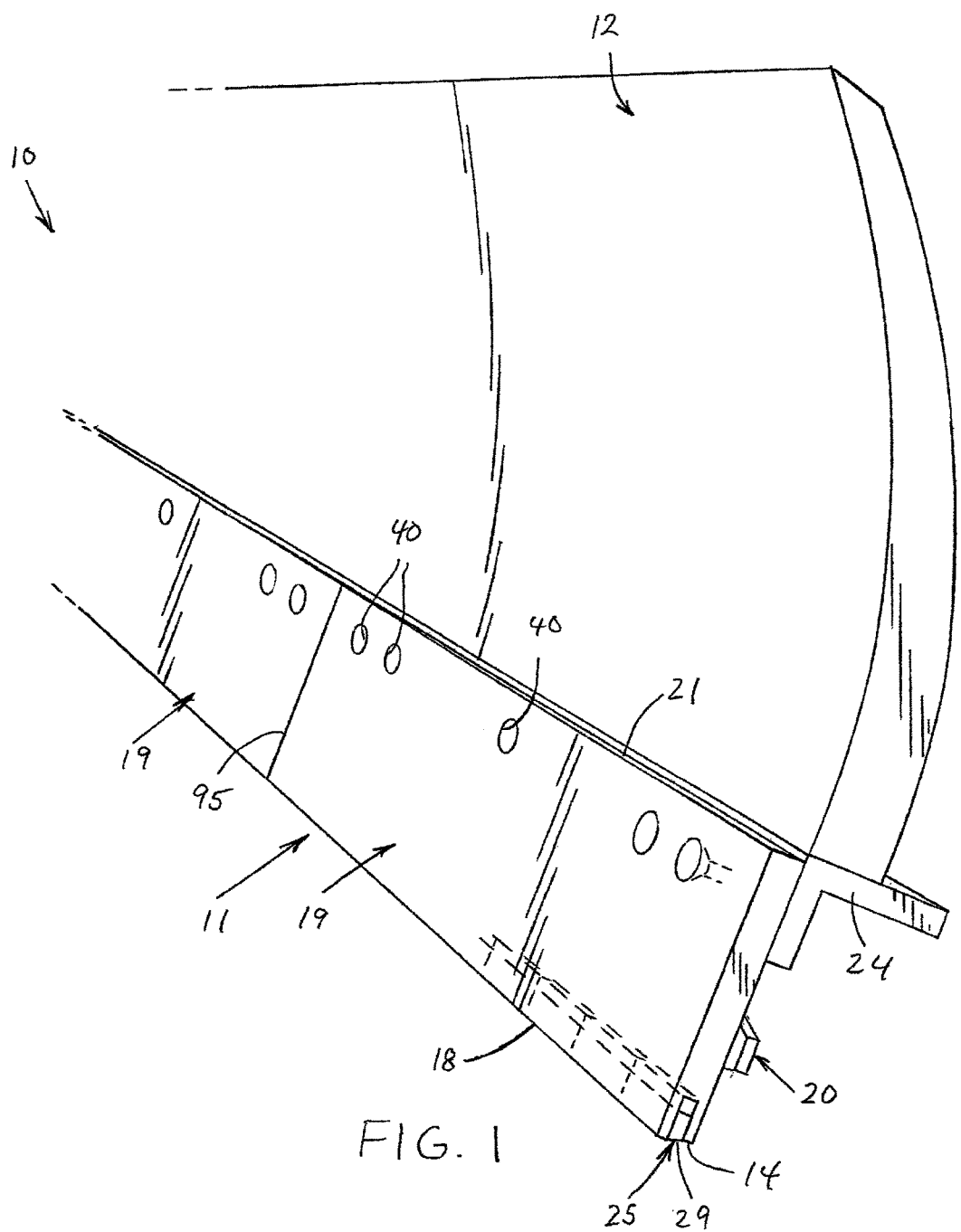
FIG. 1 is a front perspective view of a plow blade and plow blade edge system according to one aspect of the present disclosure.
Figure 2:
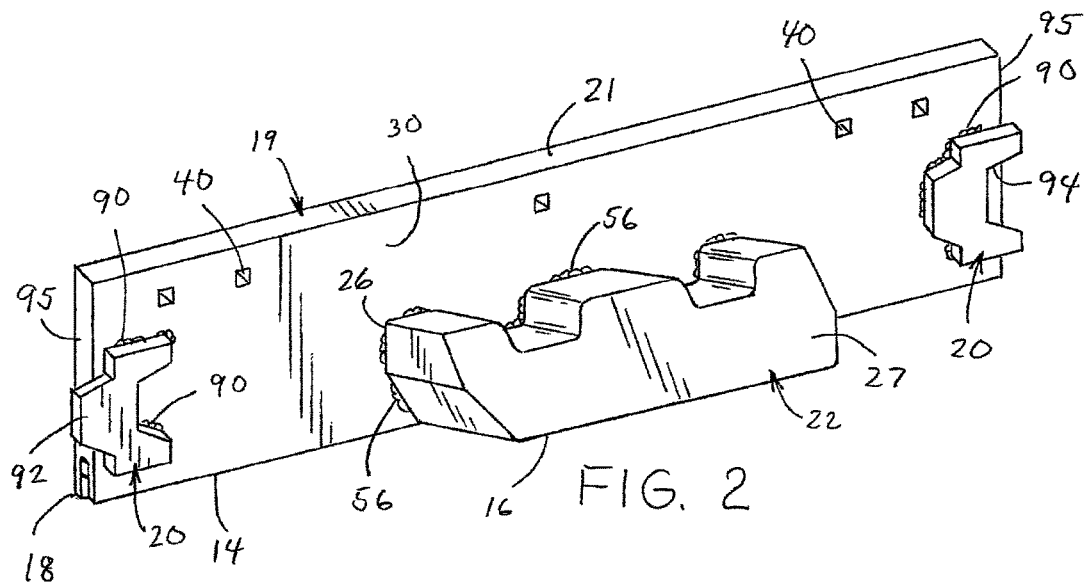
FIG. 2 is a rear perspective view of the plow blade and plow blade edge system according to one aspect of the present disclosure.
Figure 3:
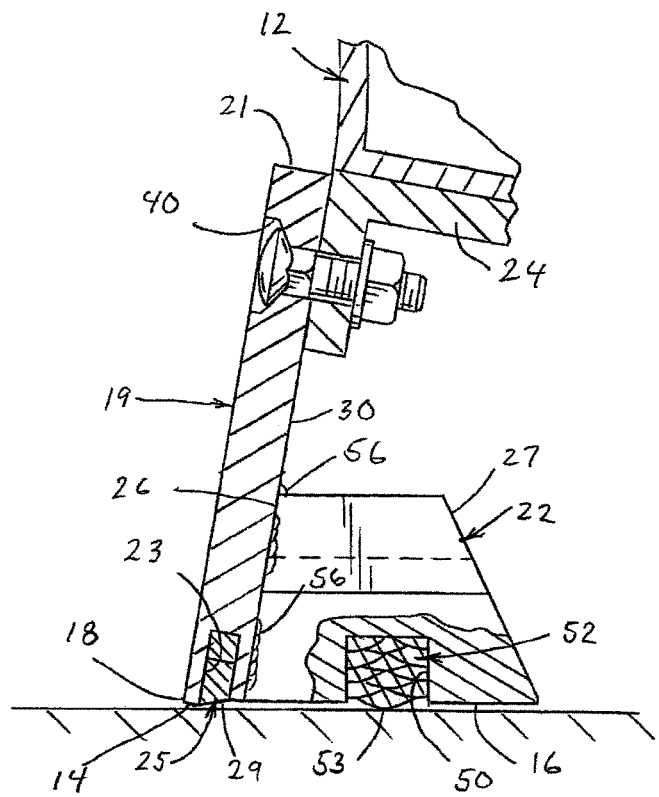
FIG. 3 is a cross-sectional view of the plow blade edge system according the first aspect of the plow blade edge system.

In a first embodiment, the plow blade edge system 10 having wear resistant surfaces 14, 16, edge blades 18, interlocking end sections, tabs or plates 20, and moldboard shoes or wear blocks 22, made in accordance with the teachings of the present disclosure is illustrated in FIGS. 1-3. Moldboard skid shoes or wear blocks 22 can be used to reduce extensive vibration, in particular, the abrasive action between the cutting edge 18 of a plow blade 19 and the associated wear blocks 22 along the road bed over which the plow travels. In one mounting arrangement (not shown), a pair of wear blocks 22 can be mounted on opposing ends of a plow blade 19 or portions of a blade. The wear blocks 22, according to a first embodiment, include a mounting face 26 which can be secured to the backside 30 of the plow blade or adapter blade 19. The wear blocks 22 can be mounted (i.e. welded) close to the cutting edge 18 of the plow blade system 10. One of the advantages of the wear blocks 22 is that they can be welded to the adapter blade 19 such that the adapter blade 19, wear blocks 22, and curb or plow end guards (not shown) can be combined all in a single plow blade edge system unit 10. It is to be appreciated that the present construction and assembly eliminates complicated and bulky supporting structures, including elimination of additional mounting elements, and thereby reduces the time and costs of fitting (mounting) the plow blade edge system 10 onto the plow blade 12.

It is to be appreciated that the mounting openings 40 for the plow blade edge system 10 are located proximal to a top edge 21 of adapter blade 19 at a standard spacing of 8 inch or 12 inch centers. As shown, the adapter blade 19 can be mounted to the plow body base member or moldboard 24 at the bottom of plow blade having 12 inch bolt hole centers or other spaced mounting arrangements.

The wear blocks 22 include generally lateral skid or wear surfaces 16. At least one cavity 50 can be cast into the bottom of wear blocks 22 at the time of casting. The wear blocks 22 can be cast from steel for greater strength and resiliency. A carbide matrix wear pad or weldments 52 can be welded into the cavity 50 to provide improved impact performance, wear resistance, and longer life to the plow blade edge system 10.

In one exemplary mounting arrangement (FIGS. 1-3), the wear blocks 22 can be mounted (i.e. pre-mounted) in a generally centered arrangement on the adapter blade 19 (i.e. centered on each section of adapter blade). The wear surfaces of wear blocks 22 reside close to, and in general alignment with, the blade cutting edge 18 and are thus a more integral part of the blade system 10 and therefore, capable of absorbing more of the undesirable abrasive wear and vibration.

The wear blocks 22 are adapted to be welded 56 (i.e. tack welded) to the back side 30 of the adapter blade 19. In one mounting arrangement, a four foot section of adapter blade 19 can be used, wherein one wear block 22 is welded to a center portion or two wear blocks are welded to opposing ends, (not shown). In another mounting arrangement, a three foot section of adapter blade 19 can be used, wherein a single wear block 22 can be welded to a generally central position on the adapter blade 19 (FIGS. 2 and 3).

Although not shown, one mounting arrangement for the wear block 22 includes a first mounting face 27 welded to the adapter blade 19 wherein the adapter blade 19 is at an angle from about 55 degrees to about 75 degrees relative to the ground surface. This mounting arrangement can be applied to a front or main plow section. As shown in FIGS. 2 and 3, a second mounting arrangement can include the mounting face 26 welded to the adapter blade 19, wherein the adapter blade 19 is at an angle from about 70 degrees to about 90 degrees relative to the ground surface. The second mounting arrangement can be used for a side or wing plow mounting configuration (not shown). It is to be appreciated that the first mounting arrangement provides an "angle of attack" of the front or main plow blade 10 for effective plowing of a road surface. It is to be appreciated that the second mounting arrangement provides an "angle of attack" which optimizes the plowing of snow or other material for a wing or side plow blade (not illustrated). The wear block 22 thus, provides two mounting arrangements and supports the two most preferred plow blade arrangements. The steel casting of the wear blocks 22 can take on the following analysis (balance iron).

| C ×100 | Mn ×100 | P ×1000 | S ×1000 | Si ×100 | Cr ×100 | B ×100 | Hardness Bhn 363/401 |
|---|---|---|---|---|---|---|---|
| 16 | 140 | 16 | 16 | 525 | 26 | 0.4 | |

The greater the impact resistance, shear strength, and hardness of the panel sections, generally the better resultant wear resistance. Accordingly, armor steel castings or boron steel can be used, typically ones with high boron chromium, carbon and silicon contents. Other armor steels, quenched and tempered ultraservice steels, and maraging steels also are useful here. As stated above, the casting process can include the provision of one or more cavities 50 in association (i.e. conjunction) with the wear surfaces of the wear blocks 22.

Figure 4:
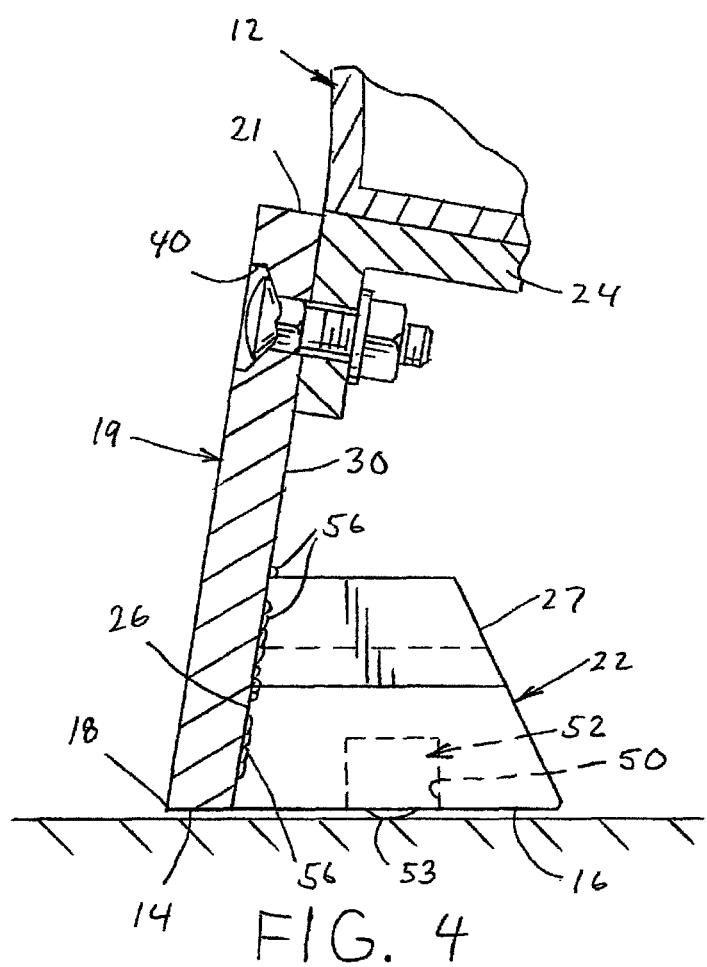
FIG. 4 is a cross-sectional view of the plow blade edge system according the second aspect of the plow blade edge system.
Figure 5:
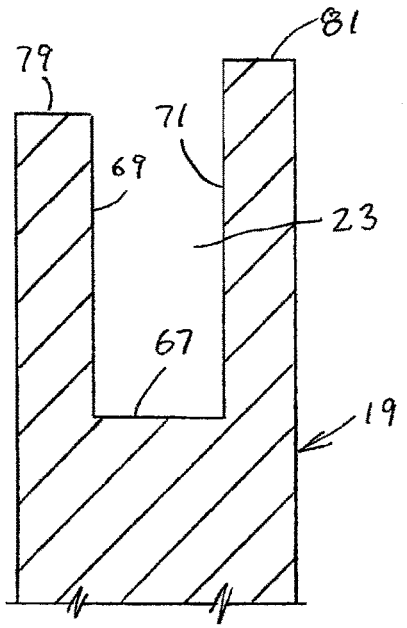
FIG. 5 is a cross-sectional view of the plow blade edge according to a process of brazing carbide insert(s) therein.
Figure 6:
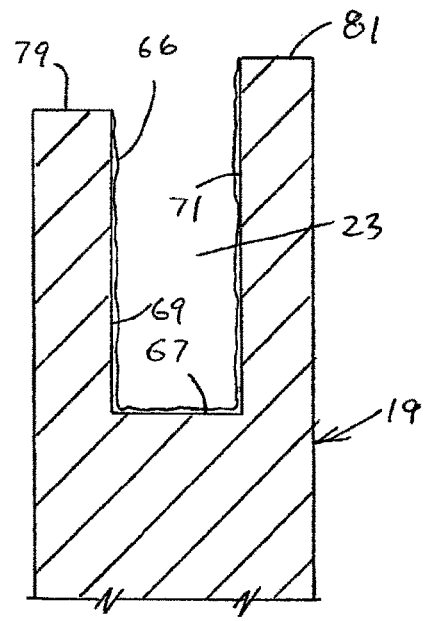
FIG. 6 is a cross-sectional view of the plow blade edge according to the process of brazing carbide insert(s) therein.
Figure 7:
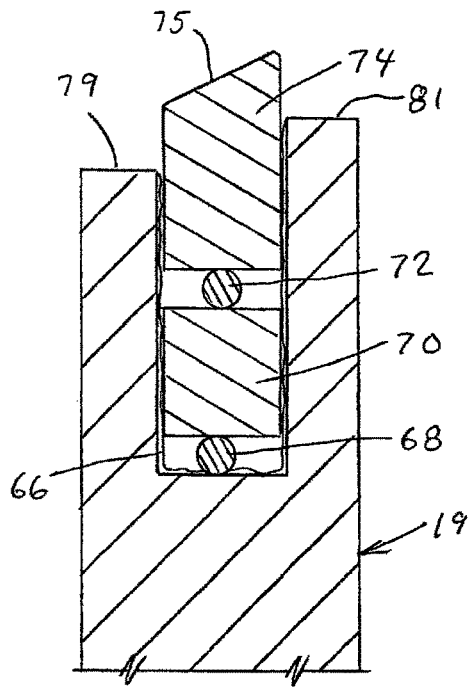
FIG. 7 is a cross-sectional view of the plow blade edge according to the process of brazing carbide insert(s) therein.
Figure 8:
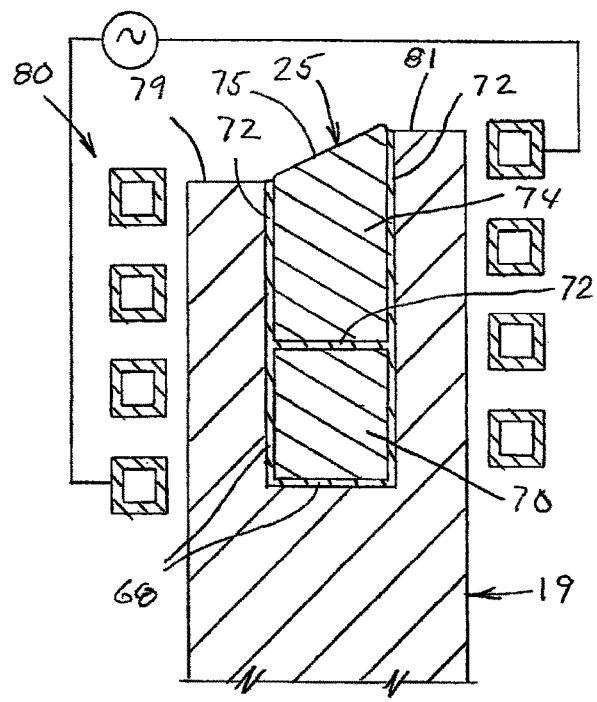
FIG. 8 is a cross-sectional view of the plow blade edge according to the process of brazing carbide insert(s) therein.
Figure 9:
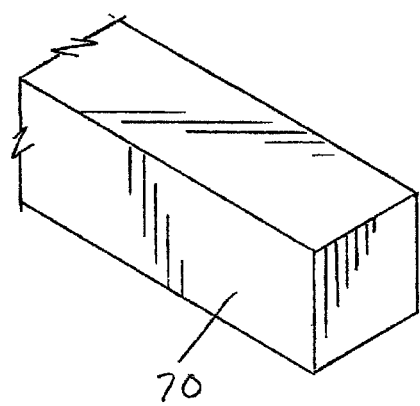
FIG. 9 is an enlarged perspective view of a first carbide insert according to the method of FIGS. 5-8.
Figure 10:
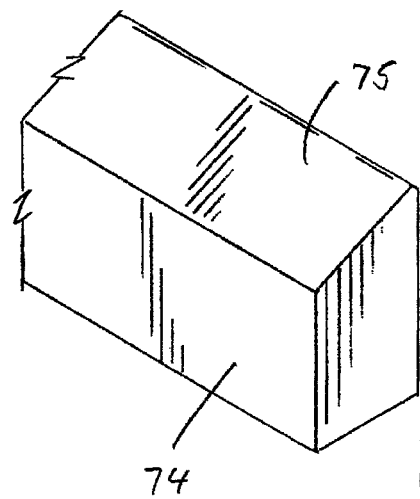
FIG. 10 is an enlarged perspective view of a second carbide insert according to the method of FIGS. 5-8.
Figure 11:
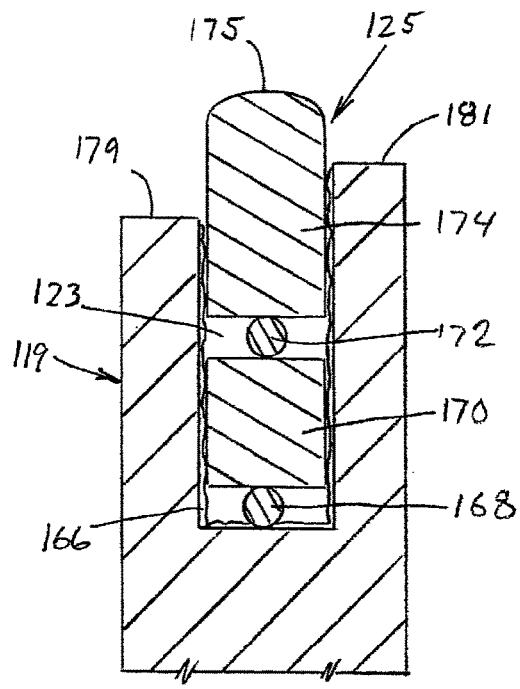
FIG. 11 is a cross-sectional view of the plow blade edge according to another embodiment of carbide inserts therein.
Figure 12:
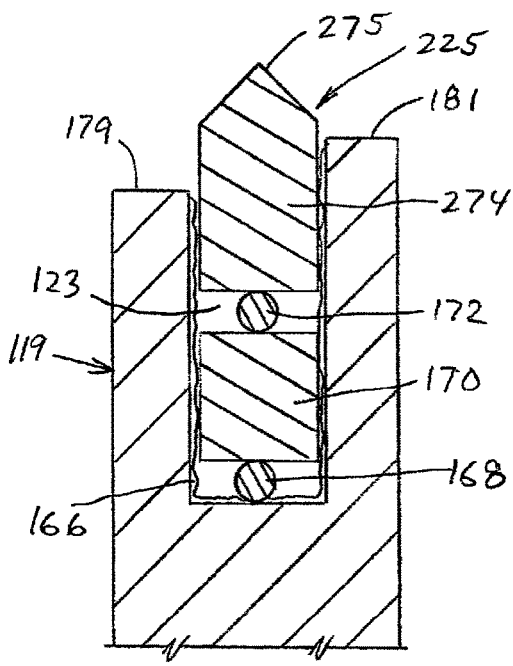
FIG. 12 is a cross-sectional view of the plow blade edge according to yet still another embodiment of carbide inserts therein; and, FIG. 13 is an enlarged perspective view of another embodiment of a second carbide insert according to the method of FIGS. 5-8.
Figure 13:
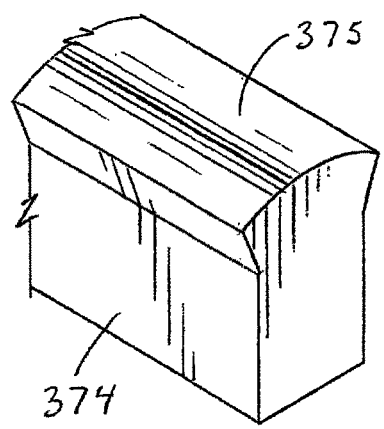

Subsequent to casting, the cavities 50 can be filled and/or overfilled by welding therein layered carbide matrix 52. The layered carbide matrix 52 can be composed of a series of layered deposits one on top of another until the cavity 50 is filled or overfilled. Overfilling the cavity 50 can result in a convex or bulbous layer 53 of carbide matrix terminating beyond, i.e. extending below, the wear surface 16 of the shoe 22. The matrix 52 provides a reconstitutable embedded weldment or resistor for increased wear resistance of the wear surface 16. In one exemplary embodiment, one longitudinal cavity 50 extends along substantially the length of the wear surface 16. As shown in FIGS. 3 and 4 the welding deposit 52 (in an unworn state) in the cavity 50 can overfill the cavity forming substantially bulbous deposit 53 extending initially outwardly from the wear or bottom surface 16 of the wear block 22.

The weldments 52 can comprise a weight of between 0.5 and 2 pounds. The weldments 52 can increase the weight of each wear block from about 2% to about 10%. The weldments 52 can be aligned with the wear surface 16 such that when the plow is in use and traveling along the road surface, the weldments 52 are transverse to the direction of travel. Alternatively, the weldments 52 can be aligned with or canted to, the direction of travel (not shown). The surface area of the weldments 52 can comprise from about 15% to about 45% of the total surface area of the bottom wear surface 16. The wear blocks 22 can be cast steel and have a generally one inch wide carbide matrix wear pad imbedded approximately ¾ inch into the bottom of each shoe. The wear blocks 22 can be provided separate from the adapter blade 19 and interlocking plates 20 such that the user can tack weld the wear blocks 22 in the mounting arrangement as desired.

The weld deposits can have the following analysis (balance iron):

| C ×100 | Cr ×100 | Mo ×100 | Si ×100 | Mn ×100 | Hardness/Rc 55-60 |
|---|---|---|---|---|---|
| 2.60 | 12.00 | 0.62 | 1.37 | .77 | |

In one arrangement, conventional hard-facing or wear-facing weldments 52 can be used for the deposits. So-called chrome carbide steels are the most common, e.g., STOODY COMPANY NO. 121, although vanadium carbide (STOODY NO. 134) and tungsten carbide ones also can be used very effectively. It is to be appreciated that the weldment material 52 deposited in the cavity 50 has a higher hardness than the steel casting therearound.

The weldment material 52 is constructed to be abrasion-resistant. Generally, it is a high chrome ferrous metal weld. It is reconstitutable in the sense that it can be repaired, replaced, or replenished by redeposition of the carbide matrix by a subsequent welding.

In addition, the adapter blade 19 can selectively include a channel 23 in association with its wear surface (refer to FIGS. 1-3). To be explained in more detail hereinafter, channel 23 can include a weldment 25 therein comprising two or more solid inserts brazed to each other and to the channel 23. Weldment 25 in channel 23 can be transverse to the direction of travel. The wear surface 29 and the embedded or brazed inserts (i.e., weldment) 25 can help to support the cutting edges 18 of the adapter blade 19 such that the abrasive action and impact from the roadbed works on the wear surfaces of weldment 52 and inserts 25 of the associated wear blocks 22 and blade 19, respectively, thereby substantially prolonging the life of the cutting edge 18 of adapter blade 19. In addition, the weldments 52 substantially prolong the life of the associated block 22 due to the wear surface 16 being a combination of carbide matrix and steel casting. The present wear blocks 22 are intended to perform better than mechanically fastened solid carbide bars would under the extreme conditions of vibration, impact and thermal shock experienced by snow plow blades.

In order to provide more wear resistance, the weldment 25 can be formed from a combination of individual carbide inserts 70, 74, thereby providing a greater volume. The individual carbide inserts 70, 74 can be used to fill a relatively larger channel 23 using two or more inserts 70, 74 of generally pre-formed, predetermined, or standard sized inserts (refer to FIGS. 8-13). The method to be described hereinafter provides for forming and filling a larger channel 23 with a multitude of inserts, while overcoming the problem of cracking that occurs when one tries to fill a relatively large channel with a respectively large singular insert. Referring to FIGS. 5-10, the method can be described as follows: forming (i.e., milling) a channel 23 into a steel section of a plow blade 19; applying brazing flux 66 to the channel surfaces; inserting a first layer of braze 68 into a base 67 of the channel 23; inserting a first carbide insert 70 over the first brazing layer 68; inserting at least a second layer of braze 72 over the first carbide insert 70; inserting at least a second carbide insert 74 over the at least second brazing layer 72; heating the first layer 68 and the at least second layer of braze 72, and the first carbide insert 70 and the at least second carbide insert 74 at a temperature of at least 1500 degrees Fahrenheit; and, melting the first layer 68 and the at least second layer of braze 72 completely around the first carbide insert 70 and around a majority of the at least second carbide insert 74 for securing the first carbide insert 70 and the at least second carbide insert 74 within the channel 23. The heating can further include induction coil heating 80 at an elevated temperature of at least 1700 degrees Fahrenheit. The melted braze 68, 72 flows into the spaces between and around the carbide inserts 70, 74 through capillary action. After the brazing layers 68, 72 have melted, the weldment is then cooled to room temperature. In one exemplary arrangement, the height of the at least second carbide insert 74 is greater than a height of the first carbide insert 70, and the volume of the at least second carbide insert 74 is greater than a volume of the first carbide insert 70. In one exemplary arrangement, the height of the second carbide insert 74 is from about ⅜" to about ⅝" and the height of the first carbide insert 70 is from about ⅖" to about ⅘". In another arrangement, the height of the at least second carbide insert 74 can be greater than a width of the at least second carbide insert 74, and the height of the first carbide insert 70 can be substantially equal to a width of the first carbide insert 70.

In one embodiment, the channel 23 can include a first wall 69 and a second wall 71, wherein the second wall 71 is taller than the first wall 69. The at least second carbide insert 74 includes an angled terminal end 75; and, the angled terminal end 75 can extend from a terminal end 81 of the second wall 71 to a terminal end 79 of the first wall 69, thereby providing an angled wear surface. The at least second carbide insert 74 is aligned over the first carbide insert 70 prior to and after the melting. The first carbide insert 70 and the at least second carbide insert 74 can be selected from the group consisting of tungsten carbide, vanadium carbide, and chrome carbide. The first layer of braze 68 and the at least second layer of braze 72 can be selected from the group consisting of rods, pellets, paste, and tube paste.

The number of plow blade edge segments mounted to a plow body will vary depending upon the size of plow body 12 used. For example, the length of the adapter blade 19 is limitless, but adapter blades 19 typically will have sections of 3 or 4 foot lengths. In this manner, any combination of two, or three, blade segments of the aforementioned section lengths can be combined to extend across a plow blade having a length of 6, 7, 8, 9, 10, 11, or 12 feet.

On the inward facing surface of the adapter blade 19, the interlocking end sections or plates 20 can be welded 90 (i.e. tack welded) thereto. The plates 20 can include male 92 and female 94 interlocking portions configured to interlock with other adjacent interlocking plates 20. The interlocking mechanism stabilizes the entire plow blade edge system 10. It is to be appreciated that the interlocking plates 20 add additional protection to the system 10 and helps absorb impact which extends the wear life of both the adapter blade 19 and the wear blocks 22.

The end 92 of one plate 20 is designed to interlock an adjacent end 94 of another plate 20 thereby stabilizing the plow blade edge system 10. Thus, the male interlock section 92 of one plate 20 can be interlocked with a female section 94 of another adjacent plate 20. The male 92 and female 94 interlock sections overlap a joint 95 of adjacent adapter blades thereby providing support to the junction between adjacent adapter blade 19 sections. In conjunction therewith, one or more integral plow blade edge sections 11 can be independently mounted or replaced. In this manner, one person can single-handedly replace one (or more) integral plow blade edge sections 11 as needed in one simple section swap.

In another embodiment, the plow blade edge system 10 can further include a plow guard or curb guard (not shown) attached to adapter blade 19 and positioned along a front side of adapter blade 19. The guards can provide even further protection and wear resistance to moldboard 24 and plow body 12. The guards can also include a bulbous outer edge for increased blade end protection.

According to yet further embodiments (FIGS. 11-13), the weldment 125, 225 can be formed from a combination of different shaped individual carbide inserts 170, 174, 274, 374. In order to reduce inventory, the standard or first carbide insert 170 can be used as the building block and base insert. The second carbide insert 174, 274, 374 can then be added to form the weldment 25 and, in particular, the second carbide insert can include any number of different insert options to suit a variety of applications and requirements. Three distinct shapes for the second insert 174, 274, 374 are shown as exemplary insert options in FIGS. 11-13, respectively. It is to be appreciated that any number of different leading edges 175, 275, 375 can be provided on the second insert. The method, described above, for forming and filling channel 123 applies to the combination of inserts shown in FIGS. 11-13. Improved performance of the combination of individual carbide inserts can be achieved by using substantially equal masses between the first and second carbide inserts. Relatively equal masses between the first and second carbide insert allow for relatively equal heating (i.e., equal distribution of heat) around the individual inserts during heating of the first and second layers.

While the present disclosure has been described as a carbide insert for improving the wear of a blade edge, in particular a snow plow edge or grader blade edge, it is to be appreciated that the device described herein can be used for improving the durability, performance, and operation of any wear surface used in the construction, road grading, agricultural, railway, and or snow plow environments.

Although the cavity 50 and the channel 23 are shown as rectilinear geometries, it is to be appreciated that the cavity and channel can take on any number of geometric cross-sections. The method for braising solid carbide inserts, as described above, provides the process for filling larger cavities and channels with two or more respectively sized solid carbide inserts. Heretofore, the problem arose wherein a single carbide insert was susceptible to cracking when one tried to fill a relatively large channel with a respectively large singular insert. The present disclosure provides a method to overcome the aforementioned problems and provides a description of the process for filling a relatively large channel or cavity with a combination of solid carbide inserts.

While the present disclosure has been particularly shown and described with reference to preferred embodiments, it will be understood by those skilled in the art that various changes in form and details may be made to the present disclosure without departing from the spirit and scope of the present disclosure described in the following claim.

The invention claimed is:

1. A method for brazing solid carbide inserts, comprising:
   forming a channel into a steel section;
   applying brazing flux to a surface of said channel;
   inserting a first layer of braze into a base of said channel;
   inserting a first solid carbide insert over said first brazing layer;
   inserting at least a second layer of braze over said first solid carbide insert;
   inserting at least a second solid carbide insert over said at least second brazing layer;
   heating said first layer and said at least second layer of braze, and said first solid carbide insert and said at least second solid carbide insert at a temperature of at least 1500 degrees Fahrenheit; and,
   melting said first layer and said at least second layer of braze completely around said first solid carbide insert and around a majority of said at least second solid carbide insert for securing said first solid carbide insert and said at least second solid carbide insert within said channel.

2. The method according to claim 1, wherein said heating is induction coil heating at a temperature of at least 1700 degrees Fahrenheit.

3. The method according to claim 1, wherein a height of said at least second solid carbide insert is greater than a height of said first solid carbide insert.

4. The method according to claim 1, wherein a volume of said at least second solid carbide insert is greater than a volume of said first solid carbide insert.

5. The method according to claim 4, further comprising:
cooling said inserts to room temperature.

6. The method according to claim 1, wherein said channel includes a first wall and a second wall; and,
said second wall is taller than said first wall.

7. The method according to claim 1, wherein said at least second solid carbide insert includes an angled terminal end; and,
said angled terminal end extends from a terminal end of said second wall to a terminal end of said first wall.

8. The method according to claim 1, wherein said height of said at least second solid carbide insert is greater than a width of said at least second solid carbide insert.

9. The method according to claim 1, wherein said height of said first solid carbide insert is substantially equal to a width of said first solid carbide insert.

10. The method according to claim 1, wherein said first solid carbide insert and said at least second solid carbide insert are selected from the group consisting of tungsten carbide, vanadium carbide, and chrome carbide.

11. The method according to claim 1, wherein said first layer of braze and said at least second layer of braze flux is selected from the group consisting of rods, pellets, paste, and tube paste.

12. The method according to claim 1, wherein said at least second solid carbide insert is aligned adjacent to said first solid carbide insert prior to and after said melting.

13. A method for brazing solid carbide inserts, comprising:
forming a channel into a steel section;
applying brazing flux to a surface of said channel;
inserting a first layer of braze into a base of said channel;
inserting a first carbide insert over said first brazing layer;
inserting at least a second layer of braze over said first carbide insert;
inserting at least a second carbide insert over said at least second brazing layer;
wherein a volume of said at least second carbide insert is greater than a volume of said first carbide insert;
heating said first layer and said at least second layer of braze; and,
melting said first layer and said at least second layer of braze completely around said first carbide insert and around a majority of said at least second carbide insert for securing said first carbide insert and said at least second carbide insert within said channel.

14. The method according to claim 13, further comprising:
cooling said inserts to room temperature.

15. The method according to claim 13, wherein said channel includes a first wall and a second wall; and,
said second wall is taller than said first wall.

16. The method according to claim 13, wherein said at least second carbide insert includes an angled terminal end; and,
said angled terminal end extends from a terminal end of said second wall to a terminal end of said first wall.

17. The method according to claim 13, wherein said first carbide insert and said at least second carbide insert are selected from the group consisting of tungsten carbide, vanadium carbide, and chrome carbide.

18. The method according to claim 13, wherein said first layer of braze and said at least second layer of braze is selected from the group consisting of rods, pellets, paste, and tube paste.

19. The method according to claim 13, wherein said at least second carbide insert is aligned adjacent to said first carbide insert prior to and after said melting.

20. The method according to claim 13, wherein said heating is at a temperature of at least 1500 degrees Fahrenheit.

21. A method for brazing solid carbide inserts, comprising:
forming a channel into a steel section;
applying brazing flux to a surface of said channel;
inserting a first layer of braze into a base of said channel;
inserting a first carbide insert over said first brazing layer;
inserting at least a second layer of braze over said first carbide insert;
inserting at least a second carbide insert over said at least second brazing layer;
wherein a mass of said at least second carbide insert is substantially equal to a mass of said first carbide insert;
heating said first layer and said at least second layer of braze; and,
melting said first layer and said at least second layer of braze completely around said first carbide insert and around a majority of said at least second carbide insert for securing said first carbide insert and said at least second carbide insert within said channel.

22. The method according to claim 21, wherein said first carbide insert and said at least second carbide insert are selected from the group consisting of tungsten carbide, vanadium carbide, and chrome carbide.

23. The method according to claim 21, wherein said at least second carbide insert is aligned adjacent to said first carbide insert prior to and after said melting.

24. The method according to claim 21, wherein said heating is at a temperature of at least 1500 degrees Fahrenheit.

25. A method for brazing solid carbide inserts, comprising:
forming a channel into a steel section;
applying brazing flux to a surface of said channel;
inserting a first layer of braze into a base of said channel;
inserting a first solid carbide insert over said first brazing layer;
inserting at least a second layer of braze over said first solid carbide insert;
inserting at least a second solid carbide insert over said at least second brazing layer;
heating said first layer and said at least second layer of braze, and said first solid carbide insert and said at least second solid carbide insert at a temperature of at least 1500 degrees Fahrenheit; and,
melting said first layer and said at least second layer of braze completely around said first solid carbide insert and around a majority of said at least second solid carbide insert for securing said first solid carbide insert and said at least second solid carbide insert within said channel.

* * * * *